INVENTOR
Vaughn K. Pryce

United States Patent Office 3,297,349
Patented Jan. 10, 1967

3,297,349
DETACHABLE HANDLES
Vaughn K. Pryce, 417 4th St., Derry, Pa. 15627
Filed Jan. 18, 1965, Ser. No. 426,309
1 Claim. (Cl. 294—2)

This invention relates to detachable handles and particularly to a handle adapted to be removably applied to a fry pan, casserole or like cooking vessel having one or more outwardly extending lugs or lips. There are on the market a variety of glass and ceramic cooking vessels which have a flat bottom and an upwardly extending flange defining the body of the vessel which flange has on its upper edge at least one outwardly extending lug or lip. Such cooking vessels are made and sold by Corning, Anchor Hocking and Owen-Illinois glass companies.

It is essential in a detachable handle for the service here contemplated, that the handle engage the lug or lip without scoring or otherwise damaging the glass or ceramic surface or otherwise setting up strains. It is also essential that the handle hold the vessel sufficiently tighly to permit its being moved between a source of heat and a place remote from said heat source without loss of engagement.

I have invented an inexpensive detachable handle which when connected to the cooking vessel will hold said vessel for lifting and moving from place to place. The handle of my invention will not score or otherwise injure the glass surface of the lug or lip. A very significant feature of my invention is that it may be quickly attached and detached without any moving parts and will hold the vessel firmly engaged so long as lifting pressure is applied. This feature is unique in the structure of my invention and cannot be accomplished by any detachable handle presently available to my knowledge.

In a preferred embodiment of my invention I provide a detachable handle of the character described comprising a hand gripping portion, a fixed gripping jaw integral with one end of the hand gripping portion, said fixed jaw having opposed U-shaped portions at opposite sides thereof, and cam means on the hand gripping portion adjacent the fixed gripping jaw. Preferably a keyhole slot is provided in said hand gripping portion for engaging a lid knob for removing the vessel lid. The detachable handle of this invention is preferably formed of stiff wire stock and coated with a corrosion resistant coating such as nickel or chromium.

In the foregoing general description I have set out certain objects, advantages and purposes of my invention. Other objects, advantages and purposes of my invention will be apparent from a consideration of the following description and the accompanying drawings in which, FIGURE 1 is an isometric view of one embodiment of detachable handle according to my invention;

Figure 1:
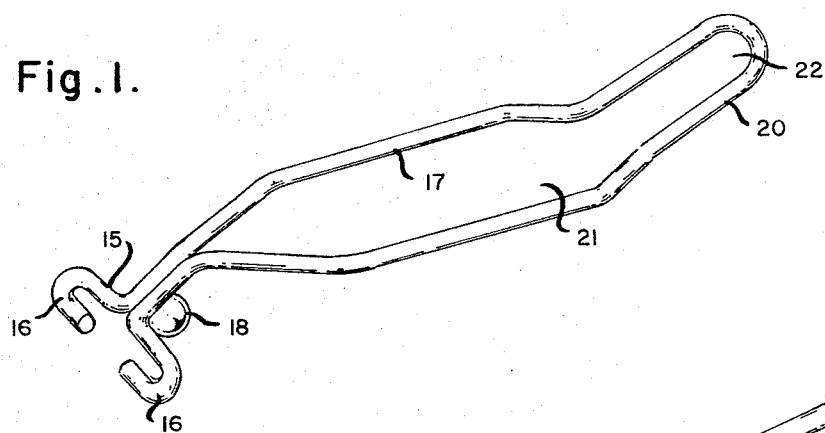

Referring to the drawings I have illustrated a conventional ceramic fry pan 10 having a bottom 11 and an upstanding flange 12 defining the fry pan. An integral lug 13 extends from the upper edge of the flange 12 generally parallel to the bottom 11 of the pan. The lug 13 is provided with a depending lip 14 at its outermost extremity.

The detachable handle of my invention is preferably provided with an upper fixed jaw 15 having depending spaced opposed U-shaped ends 16 at each side all integral with a hand gripping portion 17.

Figure 2:
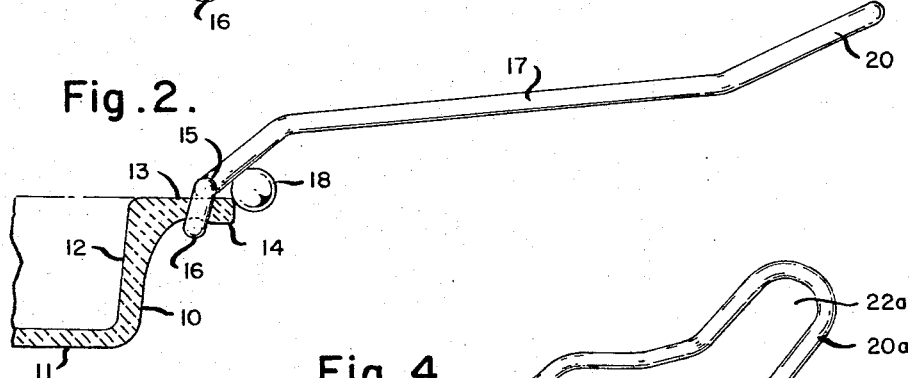
FIGURE 2 is a side elevational view partly in section of a handle according to my invention showing the handle in locking engagement with a cooking vessel.
Figure 4:
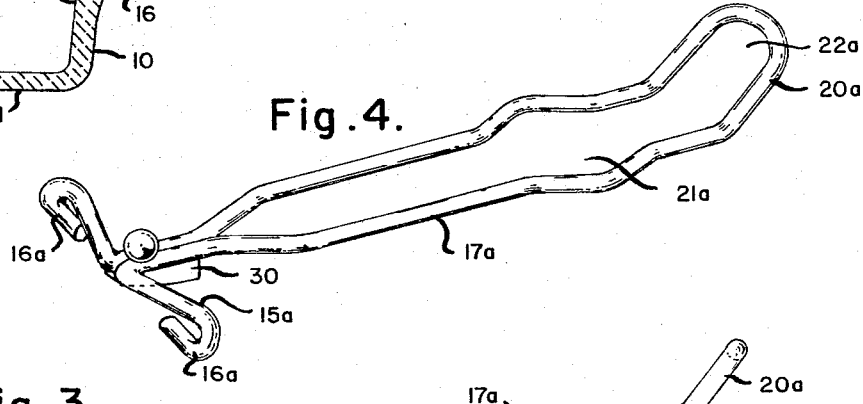
FIGURE 4 is an isometric view of the handle of FIGURE 3.

The U-shaped ends 16 may be open as illustrated or the legs may be joined to form an ovoid opening (not shown). In either case the U-shaped ends are adapted to pass over the lug 13 so that the top leg of the U-shaped member and the upper fixed jaw rest on top of lug 13 and the lower leg of each U-shaped member engages the underside of lug 13 between lip 14 and flange 12. A depending sphere 18 acts as a cam surface bearing against the end of lug 13 to draw the U-shaped member tightly against depending lip 14 when the handle is lifted as shown in FIGURE 2. The hand gripping portion 17 is preferably provided with a keyhole opening 20 having an enlarged portion 21 adapted to fit over a lid knob and a narrow slot portion 22 adapted to be drawn beneath the knob to act as the lifting means for the lid.

Figure 3:
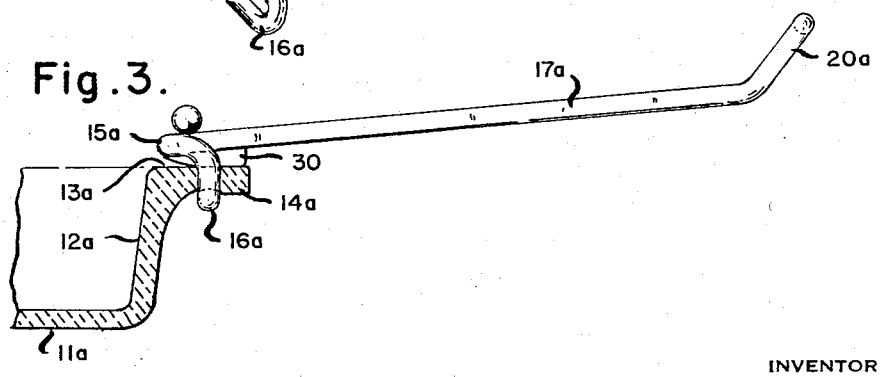
FIGURE 3 is a side elevation partly in section of a second embodiment of my invention.

In FIGURE 3, I have illustrated a second embodiment of my invention which is in most respects identical with FIGURES 1 and 2 and carries like identification numerals with the suffix *a*. The only variant is in cam 30 which replaces cam 18 of FIGURES 1 and 2 and which is in the form of an inclined surface fixed beneath hand gripping portion 17*a*.

In the foregoing specification, I have set out certain presently preferred embodiments of my invention. It will be understood, however, that the invention may be otherwise embodied within the scope of the following claim.

I claim:

A detachable handle for cooking vessels having a lug member and depending lip comprising a hand gripping portion, a fixed gripping jaw integral with one end of said hand gripping portion, opposed U-shaped portions on said fixed gripping jaw at opposite sides thereof and cam means on the hand gripping portion adjacent the fixed gripping jaw, said hand gripping portion being provided with a keyhole slot adapted to receive and engage beneath a lid knob.

References Cited by the Examiner
UNITED STATES PATENTS

| | | | |
|---|---|---|---|
| 417,578 | 12/1889 | McNeill et al. | 294—15 |
| 940,422 | 11/1909 | Ballman | 16—114 |
| 1,238,531 | 8/1917 | Lee | 294—2 |
| 1,298,662 | 4/1919 | Chadwick | 294—27 |
| 1,437,171 | 11/1922 | Currey | 16—114 |
| 1,773,628 | 8/1930 | McGirk | 16—114 |
| 1,824,562 | 4/1931 | Muhlichen | 294—29 |

M. HENSON WOOD, Jr., *Primary Examiner.*

EVON C. BLUNK, *Examiner.*

C. H. SPADERNA, J. N. ERLICH,
*Assistant Examiners.*